United States Patent [19]

Mortoly, deceased et al.

[11] Patent Number: 4,952,269

[45] **Date of Patent: * Aug. 28, 1990**

[54] AUTOMATIC CLAMP ADJUSTER

[75] Inventors: John L. Mortoly, deceased, late of Poughkeepsie, N.Y., by Harriet E. Mortoly, executrix; Bradley S. Quick, Pleasant Valley, N.Y.

[73] Assignee: James L. Taylor Mfg. Co., Poughkeepsie, N.Y.

[ * ] Notice: The portion of the term of this patent subsequent to Oct. 18, 2005 has been disclaimed.

[21] Appl. No.: 244,915

[22] Filed: Sep. 14, 1988

Related U.S. Application Data

[63] Continuation of Ser. No. 846,363, Mar. 31, 1986, Pat. No. 4,778,555.

[51] Int. Cl.[5] .............................................. B23Q 3/08

[52] U.S. Cl. ................................ 156/350; 144/245 B; 269/25

[58] Field of Search .................... 269/910, 20, 155, 58, 269/25, 27, 26, 31; 156/350, 358; 92/96; 100/232; 144/242 B, 245 B, 245 A

[56] References Cited

U.S. PATENT DOCUMENTS

| | | | |
|---|---|---|---|
| 2,471,579 | 5/1949 | Neuroth | 137/157 |
| 2,894,545 | 7/1959 | Wirth | 144/125 |
| 3,771,779 | 11/1973 | Mortoly | 269/23 |
| 4,609,002 | 9/1986 | Noh et al. | 134/62 |
| 4,778,555 | 10/1988 | Mortoly | 156/350 |

*Primary Examiner*—Michael W. Ball
*Assistant Examiner*—Jeff H. Aftergut
*Attorney, Agent, or Firm*—Weingram & Zall

[57] ABSTRACT

An automatic clamp tightener utilizes a pivotally mounted air driven rotating tightener which pivots about a base via the inflation and deflation of a flexible diaphragm. Sensors are utilized to locate the tightener and sense when a clamp is to be tightened or loosened. Sensors also detect when the tightener is driven to a stall condition indicating that the clamp is tightened. The work piece is flattened via two hold down bars which move into and out of engagement with the work piece under automatic control to hold the work piece firmly in place and to pressurize same while the clamp is being tightened. The tightener and the automatic flattener are mounted on the same supporting frame which moves laterally along the location of the clamps to be adjusted.

11 Claims, 4 Drawing Sheets

AUTOMATIC CLAMP ADJUSTER

CROSS REFERENCE TO RELATED APPLICATIONS

This is a continuation of co-pending application Ser. No. 846,363 filed on Mar. 31, 1986, now U.S. Pat. No. 4,778,555.

BACKGROUND OF THE INVENTION

1. Field of the Invention

This invention relates to a device for automatically tightening and loosening clamps. The specific application of the invention is for clamps in a wood gluing machine; however, the structure and concepts of the invention are usable in any apparatus where clamps are to be tightened or loosened. In fact, the invention is not limited to the tightening or loosening of clamps but may be used to automatically open and close any threaded nut.

2. Description of the Prior Art

U.S. Pat. No. 4,489,925, commonly assigned, discloses a device for clamping a number of wood work pieces. That device has a number of clamp carriers or clamp frames. A plurality of clamps are mounted on each clamp frame or carrier. In operation, the wood pieces to be glued are placed within the jaws of the clamps on each clamp carrier and then a new clamp carrier is brought into operation by removing the wood with the glue having dried, and reinserting new glued pieces of wood therein.

The wood gluing art has long recognized the need to automate what, for many years, has been essentially a manual operation. The field involves the cutting and sizing of strips of wood which are then glued along their edges, clamped together, the glue being allowed to set, and the wooden panel thus formed removed for further processing. Examples of various machinery developed to automate the steps in this basic operation are shown in U.S. Pat. Nos. 4,374,165 and 4,062,320 commonly assigned, where equipment to automate the edge gluing of the strips of wood is disclosed.

The present invention represents an extension of the industry trend to automate various of the steps in the process and involves an apparatus which automatically tightens and loosens the clamps on the machine of the type shown in the aforementioned U.S. Pat. No. 4,489,925.

SUMMARY OF THE INVENTION

The present invention utilizes an electronic sensor and programmable controller. Sensors, which will be described in connection with the detailed description below, detect the location of a clamp or other screw thread to be rotated. The unit is automatically shifted to that point and the rotating chuck is brought into engagement with the clamp. The chuck is driven until it reaches a stall condition at which time such condition is sensed, and the unit withdrawn and indexed to the location of the next clamp to be rotated. In the wood gluing apparatus where the invention has been utilized, the clamps are for the wood gluing machine of the type shown in U.S. Pat. No. 4,489,925, commonly assigned. As shown therein, a series of clamps are employed to hold several work pieces (each of which consists of several pieces of wood to be glued together into a single unit). Specifically, the glued pieces are stacked edge to edge for the desired width. A number of such pieces, 4–6 depending on size, are placed on a table-like configuration. Each of the sets are clamped into place by hand tightening; then, the automatic clamp tightener of the present invention serves to tighten the clamps sequentially firmly against each work piece.

On completion of the tightening, the entire array of tightened clamps are automatically indexed, as by rotation, with their associated work pieces, so that a new table-like surface is presented to the operator for processing. If the wood is sufficiently cured and is ready for removal, the invention automatically loosens the clamps allowing the cured wood to be removed.

Again, the specifics of the invention are not limited to clamps or to wood gluing. In brief, the invention employs a air driven rotating chuck or lug wrench of the type such as a Taylor 8000. This device, commercially available, is mounted for pivoting into and out of engagement with the clamp to be rotated. The entire pivotable unit rides on a frame which carries it laterally from station to station. As will be seen, the rotating chuck pivots away or out of engagement with a clamp and the frame is indexed so that the entire unit moves to the next clamp location, where, automatically, the chuck pivots into engagement with the clamp and drives to stall to tighten, or, in the opposite direction, to loosen the clamp.

The indexing and tightening mechanism of the present invention, when used in gluing and clamp tightening for wood, employs an added step and structure which serves to first automatically flatten the various pieces of the wood panel, then tighten the clamp. This flattening structure includes two elongated arms which are dropped down onto the top surface of the stack of wooden pieces to flatten same and hold them in place. The clamp chuck then pivots and engages the clamps to sequentially tighten same. Thus, the work piece is held securely in place during the tightening and loosening of the clamp.

It is an object of the present invention to automatically tighten and loosen the clamps in a wood gluing machine.

Another object of the present invention is to speed up the throughput and/or productivity of a wood gluing process by providing automatic clamp opening and closing.

Another object of the present invention is the provision of a automatic clamp tightener for any type of clamp.

Another object of the present invention is the provision of an automatically indexed system for a stall operated lug wrench which locates the wrench at the desired locations.

Another object of the present invention is to provide a means for securely holding in place the work piece during the tightening of the clamp.

Another object of the present invention is to automatically flatten the work piece and hold it in place while the clamp is being tightened and loosened.

Another object of the present invention is to provide an automatic mechanism for supporting the work piece during adjustment of the clamp.

Another object of the present invention is the provision of a combined flattener for the work piece and clamp tightener so that the work piece is automatically first flattened, then the clamps are tightened while the flattener maintains pressure on the top surface of the work piece.

BRIEF DESCRIPTION OF THE DRAWINGS

These and further objects and advantages of the present invention will become apparent to those skilled in the art from review of the following specification and accompanying drawings in which.

DETAILED DESCRIPTION OF THE INVENTION

The present invention includes two subassemblies, a flattener subassembly and an air-driven tightener subassembly, both mounted on a frame. The frame is in turn mounted on a rail structure formed along the front or working position of the machine described in my U.S. Pat. No. 4,489,925. A motor is provided at one end of the rail which is coupled to the frame. The motor is capable of moving the frame along the rail and locating same at the desired position relative to the clamp and the work piece. The details of the frame and rail structure are described in connection with FIGS. 5-6 below.

Figure 1:
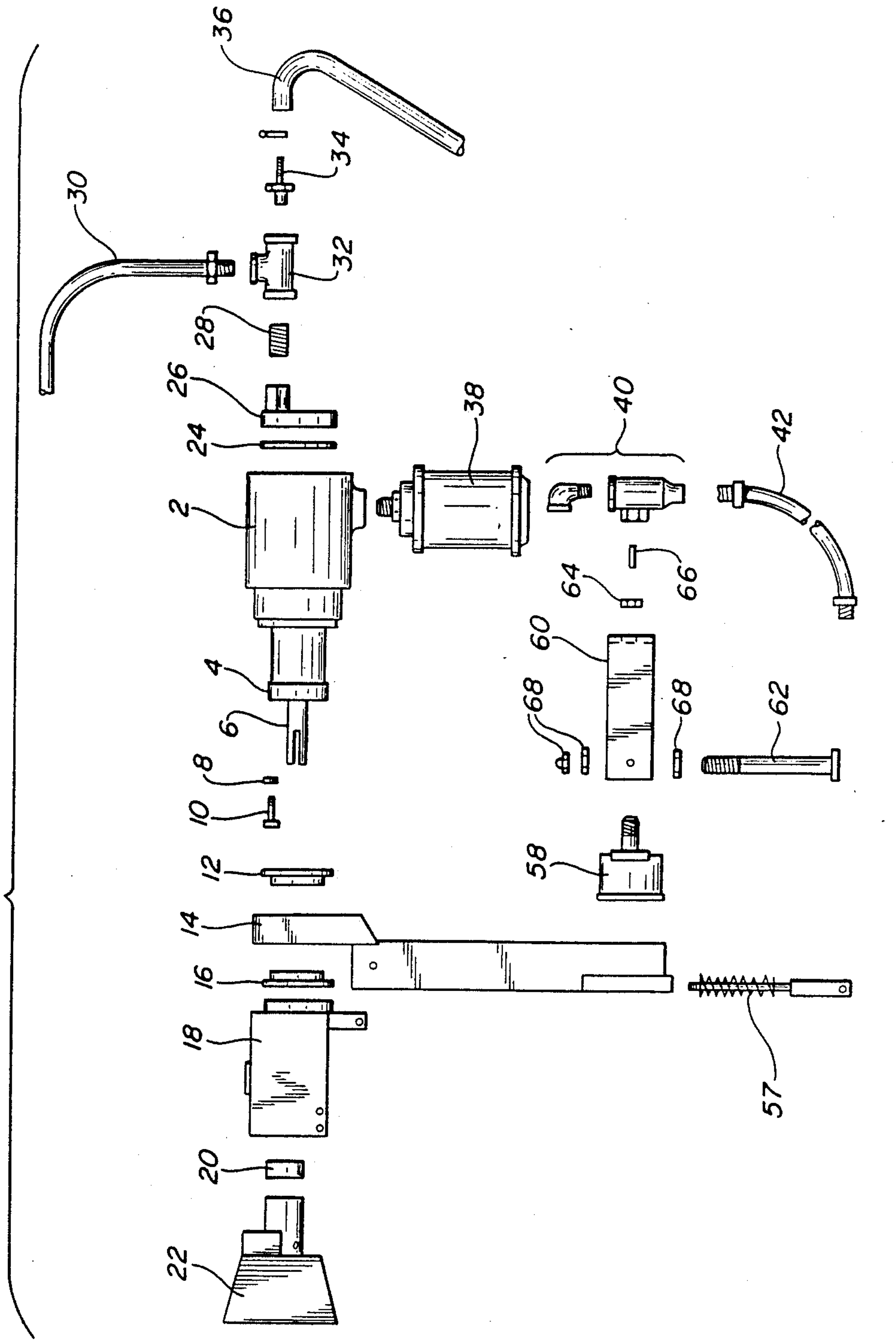
FIG. 1 is an exploded view of the air-driven rotating chuck and supporting structure of the present invention.

FIG. 1 is an exploded view of the clamp tightener and its mounting structure for the present invention. Note that FIG. 1 does not show the frame or the flattener and hold down mechanism for the work piece discussed above. FIG. 1 shows the pivoting tightener mounted for engagement with the clamps. More particularly, the tightener is shown at 2 having a rotating chuck 4 and a tightening element or bit 6. A muffler 38 is coupled to the tightener 2 in standard fashion. The tightener is air driven and is connected to air lines 30 and 36 via a Tee 32. The usual gasket, 24, mounting bracket 26, and screw threaded elements 28 and 34, are employed with Tee 32 to couple the air lines to the tightener 2.

A hooded mounting structure, generally indicated at 21 to shield and support the rotating bit 6 and chuck 4 is shown as comprising elements 8, 10, 12, 14, 16, 18, 20 and 22. More specifically, the hood 22 shields bit 6 from access by the operator or from interference by other devices as a safety feature. The hood 22 is mounted for engagement on bearing 20 and flange 18. A bracket 14 and supports 12 and 16 are provided to support the shield structure in bracket 14. Bracket 14 is, in part, supported by spring 57. The entire unit is pivotally mounted on bracket 14.

The tightener is pivoted into and out of engagement via a air driven bladder shown at 58. More particularly, the bladder is coupled to the bracket 14 and on actuation, is filled with air to push the bracket and the tightener into engagement with the clamp. When the bladder is evacuated, gravity causes the tightener to tip backwards and fall out of engagement with the clamp to a predetermined position determined by stops on the bracket 14. The bladder 58 has supporting hardware 60, 62, 64, 66 and 68 to connect it to an air valve 40 and an air line 42.

Figure 3:
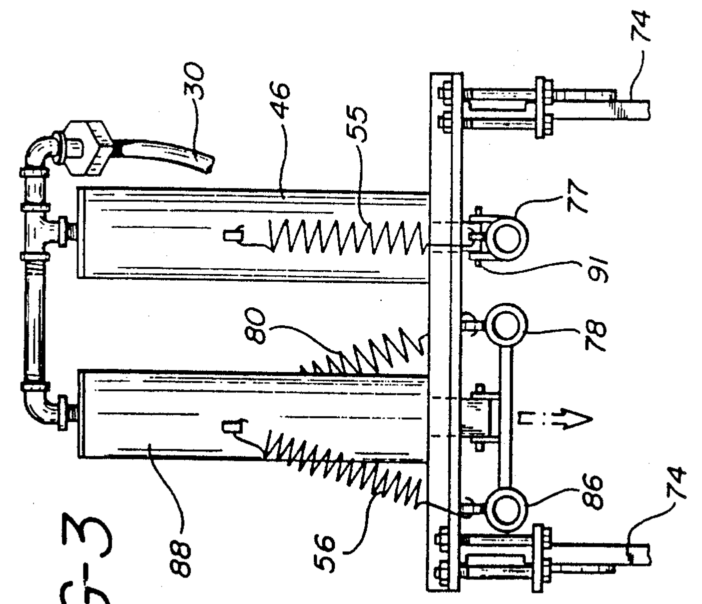
FIG. 3 is an end view of the flattener portion of FIG. 2.
Figure 2:
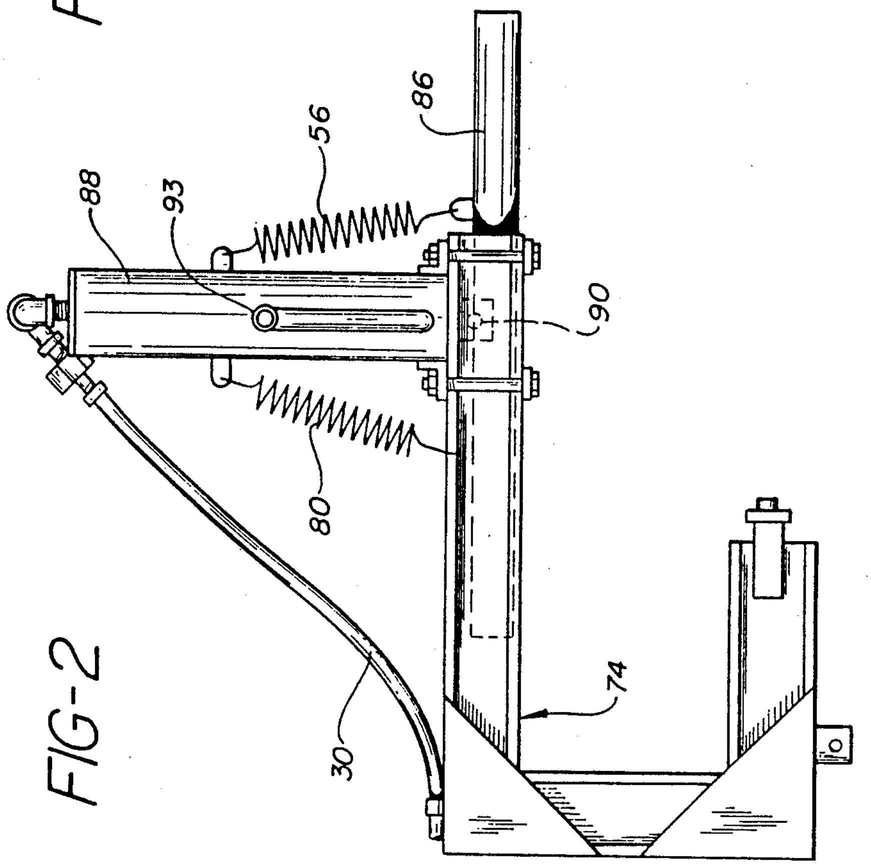
FIG. 2 is a side view of the flattener of the present invention on the slidable mounting frame.
Figure 5:
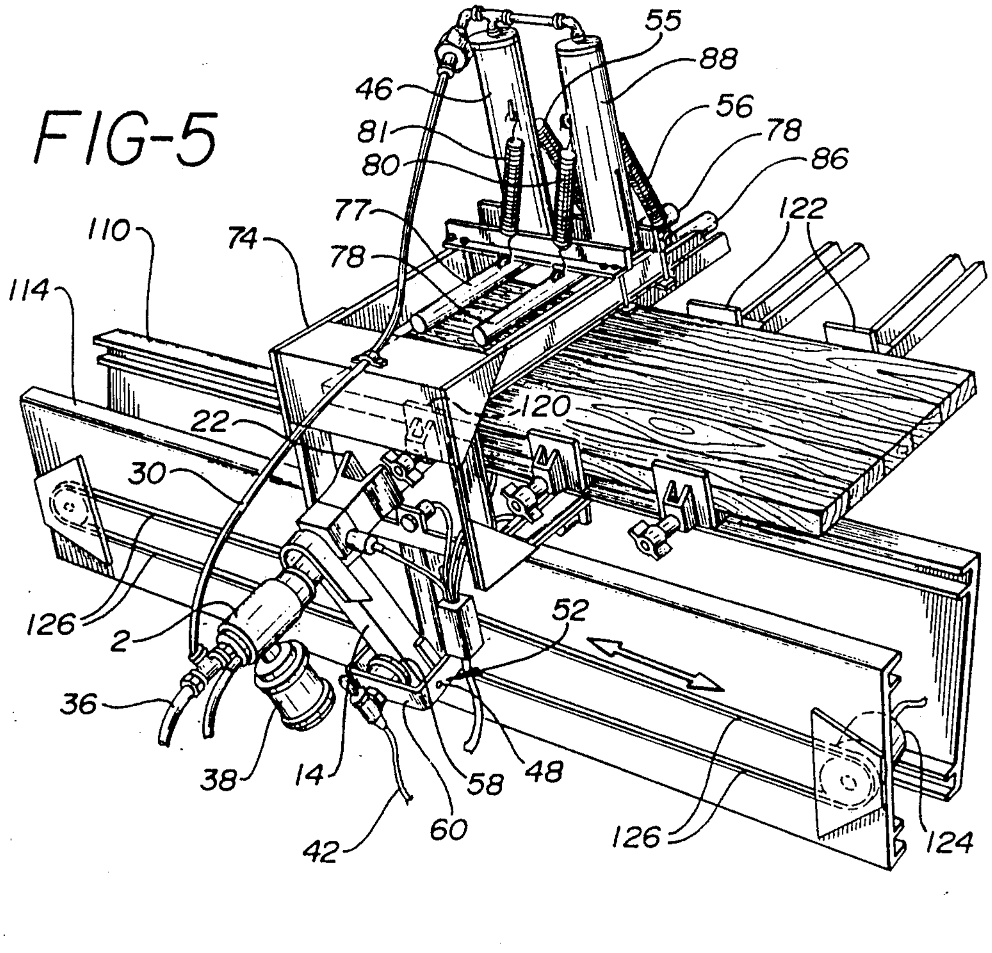
FIG. 5 is a perspective view of the subassemblies of FIGS. 1-3, mounted for operation.

FIG. 2 is a side view of the mounting and support for the work piece flattener mechanism. More particularly, two cylindrical bars 86 and 78 are mounted on a pivot 90. Pivot 90 is connected to the piston of an air cylinder 88. On command, the air cylinder will fill, causing its piston to drop bars 78 and 86 into contact with the work piece to hold them down against the force of springs 56 and 80 during the tightening operation. FIG. 3 shows the mounting of the cylindrical bars 78 and 86 to the air cylinder 88. Another air cylinder, 46, is provided which drives a lead flattening shoe or cylindrical bar 77. This lead bar is actuated by air cylinder 46 and is connected by forward and rear springs 81 and 55 respectively. It has a pivot 91 in the same manner as hold down bars 86 and 78 are connected to the air cylinder by pivot 90. Both air cylinders 46 and 88 are actuated from the same air line 30 at the same time. Lead flattening cylinder 77 is located approximately a foot from the forward flattening shoe 78 of the pair 78, 86. The purpose of the lead flattening shoe is to hold down and align the wood in the next location to be flattened as well as to make sure that the wood is properly flattened by hold down bars or shoes 86 and 78. Note that forward and rear spring 80 and 56 are attached to different hold down bars as shown in FIG. 5 with the forward spring attached to hold down bar 78, while rear spring 56 is attached to hold down bar 86. This avoids an uneven pull being placed on the hold down bars by the action of these springs. The hold down bars are prevented from rotating by means of key 93 in the slot in the air cylinder 88. Springs 56 and 80 and 55 and 81 are provided to support the bars 78 and 86 and lead bar 77 and return them to their initial position when the air pressure is released. The entire hold-down assembly is mounted on bracket 74. As will be explained below, this bracket sequentially runs along a rail to carry with it the pivoting driver subassembly shown in FIG. 1 and the flattener hold-down assembly discussed in connection with FIGS. 2 and 3.

Figure 4:
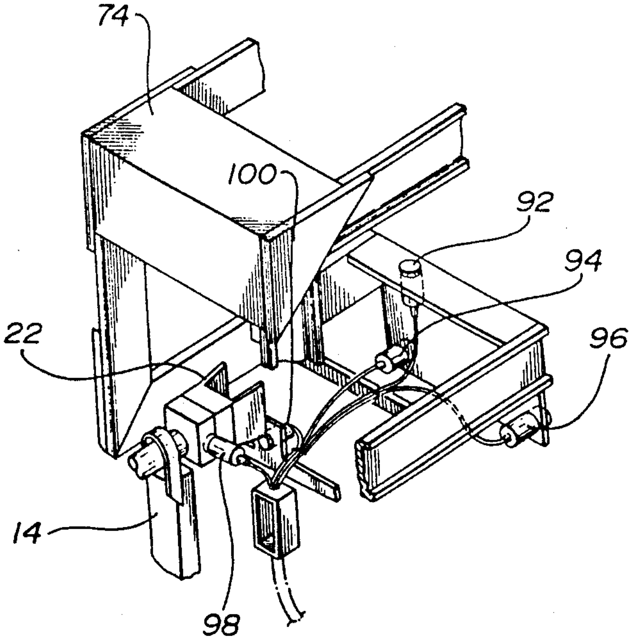
FIG. 4 is a perspective view of the sensors utilized to locate and otherwise control the flattener and the tightener of the present invention.

FIG. 4 shows the mounting of the various sensors needed to control the flattener hold-down device of FIGS. 2 and 3 and the pivoting fastener of FIG. 1. More particularly, in FIG. 4, various sensors are shown which, as will be subsequently described, feed a programmable control computer. The wood gluing embodiment of the invention utilizes five sensors. These sensors are proximity sensors manufactured by Industrie Elektronik GmbH, Lanterthein, Federal Republic of Germany under model umber 1AS-60-A14-S. Sensor 92 detects the clamp location. Sensor 94 and sensor 96 detect the end of the unit at the left (for sensor 94) and the right (for sensor 96). Sensor 100 detects the tightener forward motion and the tightener will drive until stalled. A detection sensor 98 determines when the stall has occurred.

These five sensors serve as input to a programmable controller manufactured by Allen-Bradley, model number SLC-100. The program for the controller (programmed into the device in accordance with the manufacturer's instructions) is set in Appendix A hereto. As can be seen, the functions are actions based on the sensing of one or more of the events which are indicated by one of the five sensors described in connection with FIG. 4 above.

FIG. 5 shows the bracket 74 mounting both the flattener subassembly and the tightener subassembly. The tightener subassembly is shown in FIG. 5 as pivoting on the base 52 of bracket 74 at pivot 48. As shown, the diaphragm or bladder 58 is mounted between arm 14 and fixed base 60. Base 60 is to provide a fixed reference point for inflatable bladder 58. As can now be seen, bladder 58 is inflated and forces arm 14 away from fixed point 60, thereby bringing the tightener shown at 22 into engagement with the clamp or, in general, the nut to be rotated.

Flattener arms 86 and 78 and lead flattener arm 77 are shown mounted laterally across the open top of frame 74. As can now be seen, the arms are forced down into engagement with the work surface as the clamp is being tightened. As shown in FIG. 5, cylindrical bars 86 and 78 are supported by springs 56 and 80. The second air cylinder, 46, is shown having its air line coupled directly to air cylinder 88 to drive lead flattener arm 77 supported by springs 81 and 55.

As will now be seen, the frame 74 can be slidably mounted or otherwise adjusted laterally to position itself relative to the clamp to be tightened.

This is accomplished by a motor 124 and connecting chains 126. The chains are connected to the support frame 74 to draw the support frame 74 along rail 114 from one side of the machine to the other, and then return to loosen clamps as desired. Numeral 120 in this figure denotes a clamp to be tightened.

Figure 6:
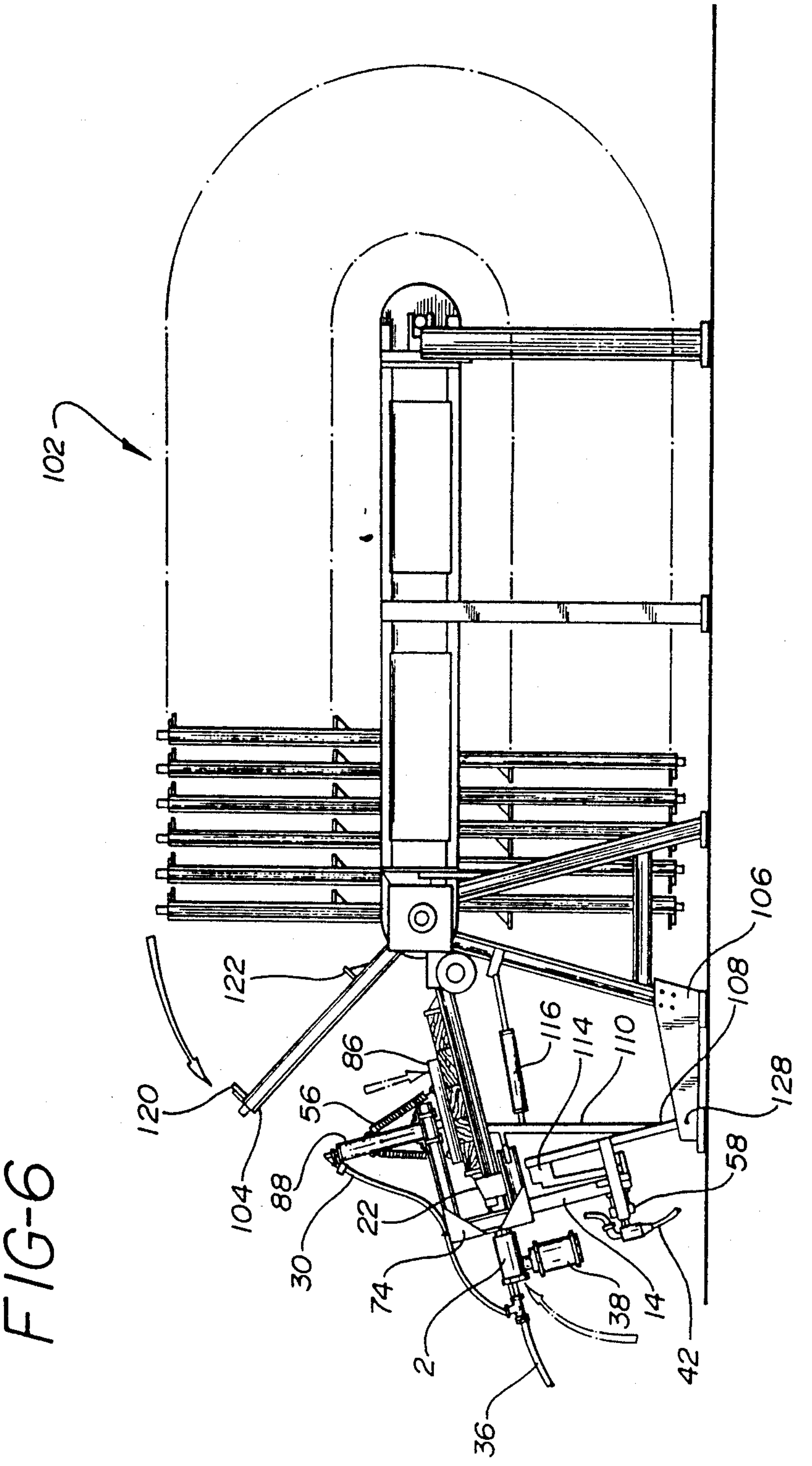
FIG. 6 is a diagrammatic view of the invention mounted for operation.

The entire operation of the device may be better understood in connection with FIG. 6, a diagrammatic view of the machine for supporting the wood pieces to be cured along with the mechanism of the present invention for tightening and loosening the clamps and for flattening the wood piece. More particularly, the machine is shown generally at reference numeral 102. The machine has a number of clamps 104 thereon, each of which has stationary and moveable jaws 120 and 122 respectively formed in sets. Jaw 122 is stationary whereas jaw 120 can be tightened or loosened. In FIG. 6, clamp 104 carrying jaws 120 and 122 is the next clamp to be brought into the working area.

The entire assembly which supports the automatic clamp tightener and the flattener must be indexed out of engagement with machine 102 if clamps 104 are to be capable of being brought into the work area. This is accomplished via base 106, air cylinder 116 and frame 110. These elements will permit the entire assembly to rotate out of the way of the clamps such as 104 to allow it to be brought into engagement with the work area. More particularly, base 106 has pivoted at pivot 128, the supporting rail 110. Air cylinder 116 allows rail 110 to pivot out of engagement with a clamp such as 104.

Note that elements 108, 110, and 114 are all one piece bolted together.

A further pivot at 128 is accomplished at arm 108. This arm allows rail 114 to also pivot out of the way of clamp 104 on actuation of air cylinder 116, and 114 to which it is bolted.

As modifications may be made to the foregoing without departing from the spirit and scope of my invention. I intend that the invention be defined in the appended claims.

Note that elements 108, 110, and 114 are all one piece bolted together.

A further pivot at 128 is accomplished at arm 108. This arm allows rail 114 to also pivot out of the way of clamp 104 on actuation of air cylinder 116, and 114 to which it is bolted.

As modifications may be made to the foregoing without departing from the spirit and scope of my invention. I intend that the invention be defined in the appended claims.

APPENDIX A

```
*PC7: ACC PROGRAM
*VALVES IN CONTROL BOX AND AUTO CARRIER ROTATION
DEFINE
1=SENSE TIGHTEN BUTTON
2=SENSE LOOSEN BUTTON
3=SENSE STOP BUTTON
4=SENSE SAFETY MAT
5=SENSE CLAMP
6=SENSE LEFT STOP
7=SENSE RIGHT STOP
8=SENSE TIGHTENER FORWARD
9=SENSE ALMOST AT FRONT REST
10=SENSE DRIVER ROTATION
11=SENSE REVERSE CARRIER ROTATE BUTTON
12=SENSE FORWARD CARRIER ROTATE BUTTON
32=REVERSE CARRIER ROTATION
31=FORWARD CARRIER ROTATION
30=CCW ROTATION
29=CW RORATION
28=TIGHTENER FORWARD
27=RUN LIGHT
26=STOP LIGHT
25=ADJUST JAW LIGHT
```

```
24=LEFT TRAVERSE
23=RIGHT TRAVERSE
22=BRAKE
98=MAT ENABLED

*HOME POSITION: WAIT FOR START BUTTON
A
UNDO 24
UNTIL 1

*START RIGHT TRAVERSE:TIGHTENING
B
UNDO 26
UNDO 25
DO 98
DO 27
DO 23
RESET 901 0000

* WAIT .5 SEC BEFORE SENSING TO GET PASSED CLAMP
TIMER 901 0005
UNTIL 901 AND /5
UNTIL 7 GOTO G

*TRAVERSE UNTIL SENSE CLAMP OR RIGHT STOP
*SKIP CLAMP IF TIGHTEN BUTTON HELD DOWN
UNTIL 5 AND /1
UNTIL 7 GOTO G

* STOP AT CLAMP, TIGHTEN
Q
UNDO 23
DO 29
DO 28
RESET 916 0000

*WAIT UP TO 1.5 SEC. FOR TIGHTENER FORWARD
TIMER 916 0015
UNTIL 916
UNDO 29
UNDO 28
RESET 917 0000

TIMER 917 0010
UNTIL 917 GOTO Q

* FLIP FLOP BETWEEN 2 STATES TO SENSE DRIVER ROTATION
C
RESET 902 0000

TIMER 902 0006
UNTIL 10
UNTIL 902 GOTO D
UNTIL /8 GOTO E

RESET 903 0000
```

```
TIMER 903 0006
UNTIL /10 GOTO C
UNTIL 903
UNTIL /8 GOTO E

* DRIVER STALLED: WAIT .3 SEC BEFORE RIGHT TRAV. AGAIN
* AFTER TIGHTENER FALLS BACK
D
UNDO 29
UNDO 28
UNTIL /8

RESET 904 0000

TIMER 904 0003
UNTIL 904 GOTO B

* SCREW PROTRUSION: LOOSEN
E
UNDO 29
DO 30
UNDO 27
DO 25
UNTIL 8

UNTIL 5
UNTIL /8

UNDO 28
UNDO 30
RESET 905 0000

TIMER 905 0015
UNTIL 905

*LEFT TRAV UNTIL HIT LAST CLAMP OR LEFT STOP
DO 24
RESET 906 0000

*GET PASSED CLAMP
TIMER 906 0005
UNTIL 906
UNTIL 6 GOTO F
*WAIT FOR START BUTTON
F
UNDO 24
UNDO 98
UNTIL 1 GOTO B

*STOP RIGHT TRAV. ROTATE CARRIER
G
UNDO 23
DO 32
RESET 907 0000

*ROTATE IN REVERSE FOR .5 SEC
```

```
TIMER 907 0005
UNTIL 907

*WAIT 1 SECOND FOR FRONT REST TO COME OUT
UNDO 32
RESET 912 0000

TIMER 912 0010
UNTIL 912

* ROTATE FORWARD FOR 3 SEC. BEFORE SENSING
DO 31
RESET 913 0000

TIMER 913 0030
UNTIL 913

*ROTATE FORWARD UNTIL SENSE AT FRONT REST
UNTIL 9

*START LEFT TRAVERSE (LOOSENING)
H
UNDO 26
DO 27
UNDO 31
DO 24
RESET 908 0000

*GET PASSED CLAMP (WAIT .5 SEC BEFORE SENSING)
I
TIMER 908 0005
UNTIL 908 AND /5
UNTIL 6 GOTO A

UNTIL 5 AND /2
UNTIL 6 GOTO A

*LOOSEN CLAMP
P
UNDO 98
UNDO 24
DO 28
DO 30
RESET 911 0000

*WAIT UP TO 1.5 SEC FOR WRENCH TO ENGAGE
TIMER 911 0015
UNTIL 911
UNTIL 8 GOTO N
*RELAX WRENCH FOR 1 SEC., TRY AGAIN
*LOOSEN UNTIL SENSE ANTI-ROTATION STAMPING OR NUT BACKS OFF
N
UNTIL 5
UNTIL /8 GOTO M

* WAIT .7 SEC BEFORE STOP LOOSENING
RESET 909 0000
```

```
TIMER 909 0007
UNTIL 909
UNTIL /8 GOTO M

*WAIT FOR TIGHTENER NOT FORWARD THEN WAIT .3 SEC
J
UNDO 30
UNDO 29
UNDO 28
UNTIL /8

RESET 910 0000

TIMER 910 0003
UNTIL 910 GOTO H

*NUT BACKOFF: TIGHTEN UNTIL TIGHTENER FORWARD AGAIN
M
UNDO 30
DO 29
UNTIL 8 GOTO R

* STOP BUTTON PUSHED, WAIT FOR START BUTTON OR HOME
K
DO 26
UNTIL 2 GOTO H
UNTIL 1 GOTO B

* WAIT .5 SEC BEFORE STOP PUTTING NUT BACK ON
R
RESET 918 0000

TIMER 918 0005
UNTIL 918 GOTO J

WHEN 3 RST K
END
* ADD THE FOLLOWING LINES TO THE PROGRAM
*      23         22
* ---| |---+----( )----
*      24   |
* ---| |---+
*
*      26      11      32
* ---| |-----| |-----(L)---
*
*      26      11      32
* ---| |-----|/|-----(U)---
*      98      4       3
* ---| |-----| |--+--( )---
*              3   |
* -----------| |--+
*
STATE  WHAT TO DO                 UNTIL              GOTO STATE
=====  ==========                 =====              ==========

 33    UNDO LEFT TRAVERSE         NOT SENSE TIGHTEN B   34
```

| | | | |
|---|---|---|---|
| 34 | UNDO STOP LIGHT<br>UNDO ADJUST JAW LIGHT<br>MAT ENABLED<br>RUN LIGHT<br>RIGHT TRAVERSE<br>RESET TIMER 901 TO 0000 | IMEDIATELY | 35 |
| 35 | RUN TIMER 901 TO 0005 | TIMER 901 COMPLETE<br>NOT SENSE RIGHT STO | 36<br>56 |
| 36 | | NOT SENSE CLAMP<br>NOT SENSE RIGHT STO | 37<br>56 |
| 37 | UNDO RIGHT TRAVERSE<br>CW RORATION<br>TIGHTENER FORWARD<br>RESET TIMER 916 TO 0000 | IMEDIATELY | 38 |
| 38 | RUN TIMER 916 TO 0015 | TIMER 916 COMPLETE<br>NOT SENSE TIGHTENER | 39<br>41 |
| 39 | UNDO CW RORATION<br>UNDO TIGHTENER FORWARD<br>RESET TIMER 917 TO 0000 | IMEDIATELY | 40 |
| 40 | RUN TIMER 917 TO 0010 | TIMER 917 COMPLETE | 37 |
| 41 | RESET TIMER 902 TO 0000 | IMEDIATELY | 42 |
| 42 | RUN TIMER 902 TO 0006 | NOT SENSE DRIVER RO<br>TIMER 902 COMPLETE<br>SENSE TIGHTENER FOR | 43<br>45<br>48 |
| 43 | RESET TIMER 903 TO 0000 | IMEDIATELY | 44 |
| 44 | RUN TIMER 903 TO 0006 | SENSE DRIVER ROTATI<br>TIMER 903 COMPLETE<br>SENSE TIGHTENER FOR | 41<br>45<br>48 |
| 45 | UNDO CW RORATION<br>UNDO TIGHTENER FORWARD | SENSE TIGHTENER FOR | 46 |
| 46 | RESET TIMER 904 TO 0000 | IMEDIATELY | 47 |
| 47 | RUN TIMER 904 TO 0003 | TIMER 904 COMPLETE | 34 |
| 48 | UNDO CW RORATION<br>UNDO RUN LIGHT<br>ADJUST JAW LIGHT | NOT SENSE TIGHTENER | 49 |
| 49 | | NOT SENSE CLAMP<br>SENSE TIGHTENER FOR | 50<br>50 |
| 50 | UNDO TIGHTENER FORWARD<br>UNDO CCW ROTATION<br>RESET TIMER 905 TO 0000 | IMEDIATELY | 51 |
| 51 | RUN TIMER 905 TO 0015 | TIMER 905 COMPLETE | 52 |

| | | | |
|---|---|---|---|
| 52 | LEFT TRAVERSE<br>RESET TIMER 906 TO 0000 | IMEDIATELY | 53 |
| 53 | RUN TIMER 906 TO 0005 | TIMER 906 COMPLETE<br>NOT SENSE LEFT STOP | 54<br>55 |
| 54 | | NOT SENSE CLAMP<br>NOT SENSE LEFT STOP | 55<br>55 |
| 55 | UNDO LEFT TRAVERSE<br>UNDO MAT ENABLED | NOT SENSE TIGHTEN B | 34 |
| 56 | UNDO RIGHT TRAVERSE<br>REVERSE CARRIER ROTATION<br>RESET TIMER 907 TO 0000 | IMEDIATELY | 57 |
| 57 | RUN TIMER 907 TO 0005 | TIMER 907 COMPLETE | 58 |
| 58 | UNDO REVERSE CARRIER ROTA<br>RESET TIMER 912 TO 0000 | IMEDIATELY | 59 |
| 59 | RUN TIMER 912 TO 0010 | TIMER 912 COMPLETE | 60 |
| 60 | FORWARD CARRIER ROTATION<br>RESET TIMER 913 TO 0000 | IMEDIATELY | 61 |
| 61 | RUN TIMER 913 TO 0030 | TIMER 913 COMPLETE | 62 |
| 62 | | NOT SENSE ALMOST AT | 63 |
| 63 | UNDO STOP LIGHT<br>RUN LIGHT<br>UNDO FORWARD CARRIER ROTA<br>LEFT TRAVERSE<br>RESET TIMER 908 TO 0000 | IMEDIATELY | 64 |
| 64 | RUN TIMER 908 TO 0005 | TIMER 908 COMPLETE<br>NOT SENSE LEFT STOP | 65<br>33 |
| 65 | | NOT SENSE CLAMP<br>NOT SENSE LEFT STOP | 66<br>33 |
| 66 | UNDO MAT ENABLED<br>UNDO LEFT TRAVERSE<br>TIGHTENER FORWARD<br>CCW ROTATION<br>RESET TIMER 911 TO 0000 | IMEDIATELY | 67 |
| 67 | RUN TIMER 911 TO 0015 | TIMER 911 COMPLETE<br>NOT SENSE TIGHTENER | 68<br>70 |
| 68 | UNDO CCW ROTATION<br>UNDO TIGHTENER FORWARD | IMEDIATELY | 69 |

```
          35      34
11    ----| |----(U)----
```

```
        35      901
12  ----| |---(RTO)---
          PR 0005

        35      901          5        36
13  ----| |----| |----|/|----(L)----

        36      35
14  ----| |----(U)----

        35       7       56
15  ----| |----| |----(L)----

        56      35
16  ----| |----(U)----

        36       5          1        37
17  ----| |----| |----|/|----(L)----

        37      36
18  ----| |----(U)----

        36       7       56
19  ----| |----| |----(L)----

        56      36
20  ----| |----(U)----

        37      23
21  ----| |----(U)----

        37      29
22  ----| |----(L)----

        37      28
23  ----| |----(L)----

        37      916
24  ----| |---(RST)---
          RE 0000
        37      38
25  ----| |----(L)----

        38      37
26  ----| |----(U)----

        38      916
27  ----| |---(RTO)---
          PR 0015

        38      916      39
28  ----| |----| |----(L)----

        39      38
29  ----| |----(U)----
```

```
        38       8       41
30  ----| |----| |----(L)----

        41      38
31  ----| |----(U)----
        39      29
32  ----| |----(U)----

        39      28
33  ----| |----(U)----

        39      917
34  ----| |---(RST)---
          RE 0000.

        39      40
35  ----| |----(L)----

        40      39
36  ----| |----(U)----

        40      917
37  ----| |---(RTO)---
          PR 0010

        40      917      37
38  ----| |----| |----(L)----

        37      40
39  ----| |----(U)----

        41      902
40  ----| |---(RST)---
          RE 0000

        41      42
41  ----| |----(L)----

        42      41
42  ----| |----(U)----

        42      902
43  ----| |---(RTO)---
          PR 0006

        42      10       43
44  ----| |----| |----(L)----

        43      42
45  ----| |----(U)----

        42      902      45
46  ----| |----| |----(L)----

        45      42
47  ----| |----(U)----
```

```
         42        8       48
48   ----| |----|/|----(L)----

         48       42
49   ----| |----(U)----

         43      903
50   ----| |---(RST)---
              RE 0000

         43       44
51   ----| |----(L)----
52   ----| |----(U)----

         44      903
53   ----| |---(RTO)---
              PR 0006

         44       10      41
54   ----| |----|/|----(L)----

         41       44
55   ----| |----(U)----

         44      903      45
56   ----| |----| |----(L)----

         45       44
57   ----| |----(U)----

         44        8       48
58   ----| |----|/|----(L)----

         48       44
59   ----| |----(U)----

         45       29
60   ----| |----(U)----

         45       28
61   ----| |----(U)----

         45        8       46
62   ----| |----|/|----(L)----

         46       45
63   ----| |----(U)----

         46      904
64   ----| |---(RST)---
              RE 0000

         46       47
65   ----| |----(L)----

         47       46
66   ----| |----(U)----

         47      904
67   ----| |---(RTO)---
              PR 0003

         47      904      34
68   ----| |----| |----(L)----

         34       47
69   ----| |----(U)----

         48       29
70   ----| |----(U)----

         48       30
71   ----| |----(L)----

         48       27
72   ----| |----(U)----

         48       25
73   ----| |----(L)----

         48        8       49
74   ----| |----| |----(L)----

         49       48
75   ----| |----(U)----

         49        5       50
76   ----| |----| |----(L)----

         50       49
77   ----| |----(U)----

         49        8       50
78   ----| |----|/|----(L)----

         50       49
79   ----| |----(U)----

         50       28
80   ----| |----(U)----

         50       30
81   ----| |----(U)----

         50      905
82   ----| |---(RST)---
              RE 0000

         50       51
83   ----| |----(L)----

         51       50
84   ----| |----(U)----

         51      905
85   ----| |---(RTO)---
              PR 0015
```

```
          51       905       52
86   ----| |----| |----(L)----

          52       51
87   ----| |----(U)----

          52       24
88   ----| |----(L)----

          52       906
89   ----| |---(RST)---
                 RE 0000

          52       53
90   ----| |----(L)----

          53       52
91   ----| |----(U)----

          53       906
92   ----| |---(RTO)---
                 PR 0005

          53       906       54
93   ----| |----| |----(L)----
          54       53
94   ----| |----(U)----

          53       6         55
95   ----| |----| |----(L)----

          55       53
96   ----| |----(U)----

          54       5         55
97   ----| |----| |----(L)----

          55       54
98   ----| |----(U)----

          54       6         55
99   ----| |----| |----(L)----

          55       54
100  ----| |----(U)----

          55       24
101  ----| |----(U)----

          55       98
102  ----| |----(U)----

          55       1         34
103  ----| |----| |----(L)----

          34       55
104  ----| |----(U)----

          56       23
105  ----| |----(U)----

          56       32
106  ----| |----(L)----

          56       907
107  ----| |---(RST)---
                 RE 0000

          56       57
108  ----| |----(L)----

          57       56
109  ----| |----(U)----

          57       907
110  ----| |---(RTO)---
                 PR 0005

          57       907       58
111  ----| |----| |----(L)----

          58       57
112  ----| |----(U)----

          58       32
113  ----| |----(U)----

          58       912
114  ----| |---(RST)---
                 RE 0000

          58       59
115  ----| |----(L)----

          59       58
116  ----| |----(U)----

          59       912
117  ----| |---(RTO)---
                 PR 0010

          59       912       60
118  ----| |----| |----(L)----

          60       59
119  ----| |----(U)----

          60       31
120  ----| |----(L)----

          60       913
121  ----| |---(RST)---
                 RE 0000
```

```
           60      61
122  ----| |----(L)----

           61      60
123  ----| |----(U)----

           61     913
124  ----| |---(RTO)---
                PR 0030

           61     913      62
125  ----| |----| |----(L)----

           62      61
126  ----| |----(U)----

           62       9      63
127  ----| |----| |----(L)----

           63      62
128  ----| |----(U)----

           63      26
129  ----| |----(U)----

           63      27
130  ----| |----(L)----

           63      31
131  ----| |----(U)----

           63      24
132  ----| |----(L)----

           63     908
133  ----| |---(RST)---
                RE 0000

           63      64
134  ----| |----(L)----

           64      63
135  ----| |----(U)----

           64     908
136  ----| |---(RTO)---
                PR 0005

           64     908       5      65
137  ----| |----| |----|/|----(L)---

           65      64
138  ----| |----(U)----

           64       6      33
139  ----| |----| |----(L)----

           33      64
140  ----| |----(U)----

           65       5       2      66
141  ----| |----| |----|/|----(L)---

           66      65
142  ----| |----(U)----

           65       6      33
143  ----| |----| |----(L)----

           33      65
144  ----| |----(U)----

           66      98
145  ----| |----(U)----

           66      24
146  ----| |----(U)----

           66      28
147. ----| |----(L)----

           66      30
148  ----| |----(L)----

           66     911
149  ----| |---(RST)---
                RE 0000

           66      67
150  ----| |----(L)----

           67      66
151  ----| |----(U)----

           67     911
152  ----| |---(RTO)---
                PR 0015

           67     911      68
153  ----| |----| |----(L)----

           68      67
154  ----| |----(U)----

           67       8      70
155  ----| |----| |----(L)----

           70      67
156  ----| |----(U)----

           68      30
157  ----| |----(U)----

           68      28
158  ----| |----(U)----
```

```
          68      915
159  ----| |---(RST)---
                RE 0000

          68      69
160  ----| |----(L)----

          69      68
161  ----| |----(U)----

          69      915
162  ----| |---(RTO)---
                PR 0010

          69      915       66
163  ----| |----| |----(L)----

          66      69
164  ----| |----(U)----

          70       5       71
165  ----| |----| |----(L)----

          71      70
166  ----| |----(U)----

          70       8       76
167  ----| |----|/|----(L)----

          76      70
168  ----| |----(U)----

          71      909
169  ----| |---(RST)---
                RE 0000

          71      72
170  ----| |----(L)----

          72      71
171  ----| |----(U)----

          72      909
172  ----| |---(RTO)---
                PR 0007

          72      909       73
173  ----| |----| |----(L)----

          73      72
174  ----| |----(U)----

          72       8       76
175  ----| |----|/|----(L)----

          76      72
176  ----| |----(U)----

          73      30
177  ----| |----(U)----

          73      29
178  ----| |----(U)----

          73      28
179  ----| |----(U)----

          73       8       74
180  ----| |----|/|----(L)----

          74      73
181  ----| |----(U)----

          74      910
182  ----| |---(RST)---
                RE 0000

          74      75
183  ----| |----(L)----

          75      74
184  ----| |----(U)----

          75      910
185  ----| |---(RTO)---
                PR 0003

          75      910       63
186  ----| |----| |----(L)----

          63      75
187  ----| |----(U)----

          76      30
188  ----| |----(U)----

          76      29
189  ----| |----(L)----

          76       8       78
190  ----| |----| |----(L)----

          78      76
191  ----| |----(U)----

          77      26
192  ----| |----(L)----

          77       2       63
193  ----| |----| |----(L)----

          63      77
194  ----| |----(U)----

          77       1       34
195  ----| |----| |----(L)----
```

```
           34        77
196   ----| |----(U)----

           78       918
197   ----| |---(RST)---
           78        79
198   ----| |----(L)----

           79        78
199   ----| |----(U)----

           79       918
200   ----| |---(RTO)---
                PR 0005

           79       918        73
201   ----| |----| |----(L)----

           73        79
202   ----| |----(U)----

            3        23
203   ----| |----(U)----

            3        24
204   ----| |----(U)----

            3        25
205   ----| |----(U)----

            3        26
206   ----| |----(U)----

            3        27
207   ----| |----(U)----

            3        28
208   ----| |----(U)----

            3        29
209   ----| |----(U)----

            3        30
210   ----| |----(U)----

            3        31
211   ----| |----(U)----

            3        32
212   ----| |----(U)----

            3        33
213   ----| |----(U)----

            3        34
214   ----| |----(U)----
```

```
            3        35
215   ----| |----(U)----

            3        36
216   ----| |----(U)----

            3        37
217   ----| |----(U)----

            3        38
218   ----| |----(U)----

            3        39
219   ----| |----(U)----

            3        40
220   ----| |----(U)----

            3        41
221   ----| |----(U)----

            3        42
222   ----| |----(U)----

            3        43
223   ----| |----(U)----

            3        44
224   ----| |----(U)----

            3        45
225   ----| |----(U)----

            3        46
226   ----| |----(U)----

            3        47
227   ----| |----(U)----

            3        48
228   ----| |----(U)----

            3        49
229   ----| |----(U)----

            3        50
230   ----| |----(U)----

            3        51
231   ----| |----(U)----

            3        52
232   ----| |----(U)----

            3        53
233   ----| |----(U)----
```

```
           3      54
234  ----| |----(U)----

           3      55
235  ----| |----(U)----

           3      56
236  ----| |----(U)----

           3      57
237  ----| |----(U)----

           3      58
238  ----| |----(U)----

           3      59
239  ----| |----(U)----

           3      60
240  ----| |----(U)----

           3      61
241  ----| |----(U)----

           3      62
242  ----| |----(U)----

           3      63
243  ----| |----(U)----

           3      64
244  ----| |----(U)----

           3      65
245  ----| |----(U)----

           3      66
246  ----| |----(U)----

           3      67
247  ----| |----(U)----

           3      68
248  ----| |----(U)----

           3      69
249  ----| |----(U)----

           3      70
250  ----| |----(U)----

           3      71
251  ----| |----(U)----

           3      72
252  ----| |----(U)----

           3      73
253  ----| |----(U)----

           3      74
254  ----| |----(U)----

           3      75
255  ----| |----(U)----

           3      76
256  ----| |----(U)----

           3      78
257  ----| |----(U)----

           3      79
258  ----| |----(U)----

           3      98
259  ----| |----(U)----

           3      77
260  ----| |----(L)----
```

We claim:

1. An automatic clamp tightener comprising:

a powered tightener;

movable means connected to and mounting said tightener;

actuating means for moving the moveable means into and out of an operative position;

control means connected to said actuating means to control said tightener; and sensing means coacting with said control means, said tightener, and said actuating means to enable automatic operation of said tightener.

2. An automatic clamp tightener comprising:

a powered tightener;

laterally movable means connected to and mounting said tightener;

actuating means for moving the movable means into and out of an operative position;

control means connected to said actuating means to control said tightener; and sensing means coacting with said control means, said tightener and said actuating means to enable automatic operation of said tightener, said sensing means generating signals indicative of the location of a clamp to be tightened to stop motion of said laterally movable means to enable actuation of said powered tightener.

3. The clamp tightener of claim 2 wherein said tightener is a fluid driven rotating tightener.

4. The clamp tightener of claim 2 wherein said movable mounting means pivots about a pivot point thereby moving said tightener into and out of said operative position.

5. The clamp tightener of claim 4 wherein said actuating means includes a flexible inflatable diaphragm whereby inflation of said diaphragm causes said movable means to move about said pivot.

6. An automated clamp tightener comprising:

a fluid-driven tightener;

a base;

fluid means connecting said fluid-driven tightener to said base;

means coupled to said fluid means for actuating said fluid means to cause the fluid-driven tightener to move into and out of operative position;

means for flattening and holding a work piece in coordinate with operation of said tightener; and sensing means coacting with said means for flattening and holding a work piece and said fluid means to cause said tightener to be actuated in coaction with actuation of the means for flattening and holding the work piece.

7. The clamp tightener of claim 6 wherein said tightener is movable laterally from one location to another.

8. In a device for allowing glued pieces of wood to dry, said device incorporating clamps to hold the pieces of wood in close and high pressure engagement, the improvement comprising:

means for automatically tightening and loosening said clamps including fluid drive rotating means mounted for engagement with said clamp;

means connected to said tightening means for automatically flattening and securely holding the wood when the clamps are being tightened including a hold-down means actuated in conjunction with said tightener means to:

(i) flatten the work piece before said clamp is tightened; and (ii) hold down and align the work pieces at the location to be tightened; and a sensor of a proximity type for generating electrical signals on the sensing of the location of a clamp to be tightened to stop motion of said laterally movable means to enable actuation of said powered tightener.

9. The device of claim 8 further including a programmable controller connected to said sensor, said controller being programmed to actuate said tightener and said hold-downs on the occurrence of the various events and generation of electrical signals corresponding thereto as sensed by said sensor.

10. A machine for clamping a plurality of glued pieces of wood, the improvement comprising:

an automatic clamp tightener and flattener assembly, said assembly comprising:

a base;

a frame attached to said base;

a tightener attached to said frame;

flattener means attached to said frame for flattening wood pieces at two adjacent work stations; and means to sense the location of said assembly including automatic proximity sensors mounted on said frame, said sensors developing electrical signals as a function of clamp location.

11. The machine of claim 10, wherein said electrical signals are connected to a programmed controller, programmed to move said tightener and to implement a control sequence in accordance with the output of said sensors.

* * * * *